United States Patent [19]

Winter et al.

[11] 4,362,262

[45] Dec. 7, 1982

[54] METHOD OF FORMING A COMPOSITE MATERIAL

[75] Inventors: Joseph Winter, New Haven; William Brenneman, Cheshire; Julius C. Fister, Hamden, all of Conn.

[73] Assignee: Olin Corporation, New Haven, Conn.

[21] Appl. No.: 303,803

[22] Filed: Sep. 21, 1981

Related U.S. Application Data

[62] Division of Ser. No. 157,997, Jun. 9, 1980, Pat. No. 4,330,599.

[51] Int. Cl.$^3$ .............................................. B23K 20/04
[52] U.S. Cl. .................................. 228/117; 228/243; 228/263 G
[58] Field of Search ............... 228/115, 117, 232, 235, 228/243, 263 E, 263 F, 263 G

[56] References Cited

U.S. PATENT DOCUMENTS

| | | | |
|---|---|---|---|
| 2,691,815 | 10/1954 | Boessenkool et al. | 29/189 |
| 2,753,623 | 7/1956 | Boessenkool et al. | 29/497.5 |
| 2,767,467 | 10/1956 | Siegel | 29/497.5 |
| 3,259,491 | 7/1966 | Pryor | 75/162 |
| 3,341,369 | 9/1967 | Caule et al. | 148/3 |
| 3,381,364 | 5/1968 | Winter | 228/335 X |
| 3,381,366 | 5/1968 | Winter | 29/472.3 |
| 3,397,045 | 8/1968 | Winter | 29/191 |
| 3,416,915 | 12/1968 | Mikawa | 75/159 |
| 3,470,607 | 10/1969 | Rader et al. | 228/117 |
| 3,475,227 | 10/1969 | Caule et al. | 148/6.31 |
| 3,496,621 | 2/1970 | Winter | 29/183.5 |
| 3,496,625 | 2/1970 | Winter | 29/199 |
| 3,634,926 | 1/1972 | Winter . | |
| 3,721,535 | 3/1973 | Pryor et al. . | |
| 3,750,253 | 8/1973 | Miller | 29/196.3 |
| 3,753,669 | 8/1973 | Churchill | 29/199 |

OTHER PUBLICATIONS

Semiatin, S. L. et al., "Formability of Sandwich Sheet Materials in Plane Strain Compression and Rolling", Met. Trans. A., AIME, vol. 10A, Jan. 1979, pp. 97–106.

*Primary Examiner*—Gil Weidenfeld
*Assistant Examiner*—Fred A. Silverberg
*Attorney, Agent, or Firm*—Barry L. Kelmachter; Howard M. Cohn; Paul Weinstein

[57] ABSTRACT

Novel and advantageous metal laminates particularly useful in making coins comprising a copper core and a cladding metallurgically bonded thereto of a copper base alloy containing from 2 to 3.5% aluminum, from 1 to 2.5% silicon and the balance essentially copper. Disclosure also teaches a method of preparing copper laminates by providing a copper core in strip form in the hard temper and a copper alloy cladding fully annealed in strip form, wherein the components are rolled together in a single pass with a reduction of from 50 to 75% to provide the metallurgically bonded laminate.

9 Claims, No Drawings

METHOD OF FORMING A COMPOSITE MATERIAL

This application is a division of application Ser. No. 157,997, filed June 9, 1980, now U.S. Pat. No. 4,330,599.

BACKGROUND OF THE INVENTION

Composite metal laminates have found wide use commercially in a variety of applications. Composite metal articles having a dissimilar core and cladding are highly desirable commercially due to the fact that the beneficial characteristics of the core and cladding may be obtained in one composite article. In a single material or alloy frequently many properties cannot be greatly modified by alloying or thermal treatments, for example, such properties as modulus of elasticity, color, density and strength in combination with high thermal or electrical conductivity. However, by forming composites apparent properties of the cladding can be generated while retaining the bulk properties of the core material. In this manner, one can often obtain greatly modified and highly desirable properties over the single alloy at a reasonable cost.

For example, copper has the advantage of high conductivity and cold formability. By forming copper composites one can retain these desirable properties while generating properties of the cladding, such as wear resistance, color, oxidation or tarnish resistance and fine finishing, i.e., surface quality. Various uses to which composite copper articles may be put include high conductivity, high strength springs, highly efficient electrical contactors, and hardware involving extensive cold forming.

Particular among current commercial uses is composite copper coinage using cupronickel clad copper wherein the core material is copper and the cladding is cupronickel. As is well known, this laminate utilizes a core material which differs markedly in color from the material used in the cladding. It would be highly desirable to provide a copper laminate which does not suffer from this disadvantage. For example, such a laminate has been used on a dollar coin referred to as the Susan B. Anthony (SBA) dollar. The SBA dollar is similar in construction to the previous coinage laminates. Objections have been raised to the SBA dollar on the grounds of its similarity to the quarter. This objection may be overcome if one could provide a coinage material for use in the SBA dollar which was of a gold-simulated color so as to contrast with other coinage materials.

However, the preparation of composite copper materials meeting the criteria required for coinage materials presents numerous difficulties. Firstly, there is the problem of preparing a composite laminate in a simple and convenient manner so as to insure a well bonded laminate. Particularly among the problems which are encountered is to metallurgically bond copper materials which are characterized by vastly different work hardening characteristics and to obtain a well bonded laminate which is not characterized by surface waves or breaks. Furthermore, coinage requirements are severe with regard to materials and characteristics of the composite.

Several methods have been proposed for providing metallurgically bonded composites, and several materials have been proposed for this use. For example, U.S. Pat. Nos. 2,691,815, 2,753,623, 2,767,467 and others are characterized by providing a poorly bonded laminate or a green bond followed by annealing treatments to improve the metallurgical bond. These methods are generally objectionable due to the increased cost of the procedure. Also, the subsequent diffusion annealing process tends to degrade the properties of the composite. Several materials have been proposed for coinage applications, such as U.S. Pat. No. 3,753,669 which proposes outer cladding layers of coin silver or cupronickel metallurgically bonded to opposite sides of a core layer of nickel silver to provide a uniform silver color along the edges of the laminates, or U.S. Pat. No. 3,750,253 which utilizes a core layer of low carbon steel, a relatively thin layer of nickel silver metallurgically bonded to each side of the core layer, and a relatively very thin layer of nickel metallurgically bonded to the outer surface of each of the layers of nickel silver. These laminates are silver in color and do not have the highly desirable gold or simulated gold coloring. Also, the latter '253 patent represents a complicated multi-composite material.

Several procedures have been proposed for preparing metal laminates utilizing a single high reduction rolling pass which results in a well bonded metal laminate. Typical among these are U.S. Pat. Nos. 3,496,625, 3,496,621 and 3,381,366, for example. In accordance with these processes, the coper base alloy core only is heated to an elevated temperature followed by rolling together the heated core and the cold cladding at a high speed of at least 100 feet per minute in one pass at a specified high reduction with the core and cladding preferably coming together for the first time in the bite of the rolls and with the cladding contacting the roll prior to contacting the core. Alternatively, the components may be rolled together in direct face-to-face contact in one pass at a high reduction with the reduction being sufficient to cause one of the components only to recrystallize with the recrystallizaton occurring either at the bite of the rolls or immediately upon exit from the rolls. These methods are effective in providing well bonded metal laminates in a convenient and commercially viable procedure. However, they do not provide a suggestion for a gold-simulated material which can be useful as a coinage material. Also, when applied to such material it is found that wavy or cracked surface finishes may be obtained which seriously detracts from the usefulness of the procedure.

Monolithic copper alloys are known having a desirable gold color, such as U.S. Pat. Nos. 3,259,491, 3,341,369 and 3,475,227; however, these materials are not suitable for coinage and preparation of composites therefrom which are suitable presents serious problems, such as objectionable surface waviness.

Accordingly, it is an object of the present invention to provide a novel composite material and a novel method for obtaining composite materials.

It is a still further object of the present invention to provide such a material and method which is useful in making coins and which has a gold-simulated color.

It is a still further object of the present invention to provide a method and article as aforesaid which is inexpensive and wherein the resultant article has a smooth surface finish.

Further objects and advantages of the present invention will appear hereinbelow.

SUMMARY OF THE INVENTION

In accordance with the present invention, it has now been found that the foregoing objects and advantages may be readily obtained. The present invention provides a composite material having a copper core and a cladding metallurgically bonded thereto with the core of copper and the cladding of a copper base alloy containing from 2 to 3.5% aluminum, from 1 to 2.5% silicon and the balance essentially copper. The composite metal laminate is useful in making coins and has a gold-simulated color. Naturally, the core may be clad on one or both sides. If a coinage material is contemplated the core should be clad on both sides with the cladding material.

The method of the present invention of forming metallurgically bonded composites has been found to effectively provide a composite material having a smooth external surface. In accordance with the method of the present invention, a copper core material is provided in strip form in the hard temper having a minimum strength of 51,000 psi yield strength at 0.2% offset. A copper alloy cladding material, preferably having a composition as defined hereinabove, is provided in strip form in the fully annealed condition to an average grain size of at least 10 microns and preferably at least 100 microns and also having a maximum strength of less than 15,000 psi yield strength at 0.2% offset. The components in the conditions as aforesaid are rolled together in a single pass with a reduction of from 50 to 75% to provide a metallurgically bonded composite having a smooth external finish which is suitable for use as coinage material. Preferably, the core and cladding or claddings enter the rolls at an angle of from 5° to 22° and also preferably come together for the first time in the bite of the rolls. The resultant well bonded laminate may be cold rolled to any desired finish gage.

The composite of the present invention has a desirable gold-simulated color and satisfactorily meets severe coinage requirements.

DETAILED DESCRIPTION

The composite of the present invention as described generally hereinabove has a copper core clad with a specifically defined copper alloy. The copper core is preferably commercial purity copper such as copper Alloy 110, although higher purity copper may of course be utilized. The commercial purity copper or its equivalent is naturally preferred due to lower cost. The cladding material is a copper alloy containing from 2 to 3.5% aluminum, preferably 2 to 3% aluminum, and from 1 to 2.5% silicon, preferably 1 to 2% silicon, with the balance essentially copper. Conventional impurities may of course be tolerated in this alloy. Also, alloying additions may be added to achieve particularly desirable properties provided of course that the foregoing yield strength requirements are satisfied.

In accordance with the method of the present invention a well bonded composite is obtained using a copper core and copper alloy cladding satisfying the requirements set out hereinabove. The preferred embodiment utilizes a copper core and an aluminum-silicon containing cladding having the compositions set out hereinabove; however, the method of the present invention is not limited to these preferred components and other copper or copper alloy materials satisfying the aforesaid yield strength and grain size requirements may be employed. Indeed, the method of the present invention is applicable to materials other than copper satisfying the aforesaid yield strength and grain size requirements, i.e., where one component is in the hard temper and the other in the fully annealed condition as described hereinabove, as for example, iron, aluminum or zinc cores and silicon, nickel or copper claddings.

As indicated hereinabove, the metallurgically bonded composite is obtained by rolling together the core and cladding in strip form in a single pass in a reduction of from 50 to 75%. The copper core material is provided in the hard temper having a minimum strength of 51,000 psi yield strength at 0.2% offset. The copper alloy cladding is provided in strip form in the fully annealed temper to an average grain size of at least 10 microns and having a maximum strength of less than 15,000 psi yield strength at 0.2% offset. The preferred cladding material is the copper-aluminum-silicon alloy described hereinabove.

Thus, in accordance with the method of the present invention one obtains a well bonded laminate utilizing two materials of vastly different work hardening characteristics. Outside of the parameters of the present invention, one obtains objectionable and pronounced waviness in the surface of the final composite. The waviness in its most severe form manifests itself in serious cracks leaving the copper core exposed. Normal methods to overcome this problem, such as increased back tension, increased friction at the roll/composite surface, and changing core-clad ratios are unsuccessful in alleviating this problem. It is believed that the waviness which may result and which is described above is related to a difference in the work hardening rate of the cladding versus the core. The problem is exaggerated by the tension induced in the surface layers being opposed by compressive forces in the core during the rolling step. In accordance with the article in *Metallurgical Transactions*, Vol. 10A, January 1979, by S. L. Semiatin and H. R. Piehler, entitled "Formability of Sandwich Sheet Materials in Plane Strain Compression and Rolling," a means was provided for analyzing the rolling curves of the core and cladding, thereby providing parameters which could be used to quantify the rate of strain induced hardening in the core and cladding during the bonding operations. The strain or bonding reductions at which waves can develop occurs when:

$$\frac{d(2\,Y_{clad})}{d\epsilon} - 2\,Y_{clad} = \frac{d(2\,Y_{core})}{d\epsilon} - 2\,Y_{core}$$

wherein Y refers to the respective flow strengths of the core and cladding and $\epsilon$ the imposed true reduction strain. The point of instability is where the curves of rate of strain induced hardening for the core and cladding intersect. In accordance with the present invention, selection of core and cladding compositions and tempers influence the point of instability where surface waviness can develop. In accordance with the present invention, increasing core strength as by cold reduction and decreasing cladding strength as by increasing grain size shifts the point of instability to higher rolling reductions or strains. It is necessary in accordance with the process of the present invention to shift the reduction at which surface waves develop to a reduction beyond that which is needed for minimum bond strength. The bonding reduction limits are determined therefore by the minimum reduction for making a bond and the reduction at which surface waviness develops.

In accordance with the method of the present invention, it has been found that surface waviness can be avoided and a firmly bonded metal composite obtained when the parameters of the present invention are scrupulously satisfied. Thus, as indicated hereinabove, the core strip is in the hard temper with a minimum strength of 51,000 psi yield strength at 0.2% offset, and the cladding is in strip form annealed to a grain size of at least 10 microns and preferably at least 100 microns and having a maximum strength of less than 15,000 psi yield strength at 0.2% offset. Also, the core and cladding in the forms indicated hereinabove are rolled together in a single pass with a reduction of 50 to 75% to provide a metallurgically bonded composite. Preferably, the core is clad on both sides. The core material represents from 40 to 90% of the thickness of the composite and the cladding from 10 to 60% of the thickness of the composite. Generally the cladding is from 5 to 30% of the thickness of the composite on each side of the core. In the preferred embodiment, the final gage of the laminate is from 0.01 to 0.1". Naturally, after the bonding step the resultant well bonded laminate may be rolled to final gage.

In the preferred embodiment, upon entering the rolls an angle is provided between the core and cladding in excess of 5°, and generally in excess of 10°, in order to insure that the core and cladding or claddings will not come together earlier than in the bite of the rolls. This is not essential, however, although it is preferred. Generally, the included angle between the core and cladding is between 5° and 22°.

In accordance with the preferred embodiment of the present invention, the cladding metal contacts the roll prior to contacting the core. This is true whether the core is to be clad on one side or both sides. On the front side of the rolls, (entering side) the claddings and the rolls are traveling at different linear speeds; whereas, at the exit side they are going at the same speed due to the reduction in thickness of the composite. The difference in traveling speeds between the cladding and the rolls, coupled with the pre-contact between the cladding and the rolls, generates a shearing strain to the core-clad interface. The shear strain at the core-clad interface results in turbulent flow of metal at the interface which causes an intimate bonding and increases the interfacial linear surface of the composite by generally 20% or more. The core material is in the full hard condition and is able to sustain a very large reduction of up to 75% by dynamically recrystallizing in the bite of the rolls so that such a large reduction is possible in accordance with the process of the present invention.

It has been found that the simple process delineated hereinabove utilizing the parameters described above achieves a highly advantageous composite article which is well bonded and which is free from surface waviness. The resultant composite articles have a desirable gold color and do not suffer from an objectionable silver-gold contrast as is characterized by present coinage materials. The resultant material has very high bond strength and the absence of atomic interdiffusion between base metal and cladding, which interdiffusion may result in the formation of brittle compounds.

Prior to the bonding reduction, the core material is preferably provided in plate form having a thickness less than ½", and the cladding material in plate form less than ¼" in thickness. Surface oxides, unless massive, are generally no handicap to the process of the present invention. It is, however, desirable to remove dirt or adhering lubricant from the surface of the metal prior to the bonding step in order to assure good frictional contact between the core and cladding.

Subsequent to the bonding step of the present invention, no further operations whatever are required. The composites are provided in commercial form ready to be used for the desired application. It may naturally be desirable to perform conventional subsequent operations for particular applications. For example, short thermal treatments for stress relief or the attainment of desired properties, e.g., a short heat treating anneal or aging treatment, a rolling operation for dimensional control, additional work hardening, cold rolling to final gage, and so forth.

Throughout the present specification where percentages of ingredients are employed weight percentages are intended.

The present invention will be more readily understandable from a consideration of the following illustrative examples.

EXAMPLE I

This comparative example describes attempts to prepare a three (3) layered metallurgically bonded composite with a commercial purity (copper Alloy 110) copper core clad on both sides with a copper base alloy containing 2.8% aluminum and 1.8% silicon, balance essentially copper. The cladding material was prepared for the bonding reduction by cold rolling 78% to give a strip material having a thickness of 0.069 inch followed by annealing for one (1) hour at 570° C. The resultant cladding material had a yield strength of about 24,000 psi at 0.2% offset and an average grain size of 50 microns. The copper Alloy 110 core was a strip material having a thickness of 0.131 inch in the soft condition having a yield strength of about 8,000 psi at 0.2% offset. Thus, both core and cladding were outside of the parameters of the present invention. The said core was then rolled with the said cladding on both sides thereof in a single pass with a reduction of 52%. No bonding of the core and claddings took place. Attempts to produce a metallurgically bonded composite using the aforesaid components at higher reductions resulted in cracking of the claddings.

EXAMPLE II

This comparative example describes attempts to prepare a three (3) layered metallurgically bonded composite in a manner after Example I by varying the conditions in Example I. The materials used in this Example II were as in Example I, except that the core was in the hard temper by cold rolling in excess of 70% to provide a strip material having a yield strength of about 52,000 psi at 0.2% offset. Thus, the core was within the parameters of the present invention, but the cladding still outside said parameters. The core was then rolled with the cladding on both sides thereof in a single pass with a reduction of 56%. Some bonding took place, but there was objectionable surface waviness in the clad components. Attempts to increase the bonding reduction to 60% increased the severity of the surface waves.

EXAMPLE III

This comparative example describes attempts to prepare a three (3) layered metallurgically bonded composite in a manner after Example II by varying the conditions in Example II. The materials used in this Example III were as in Example II except that the cladding material was annealed at 800° C. for one (1) hour to provide a strip material having a yield strength of 19,800 psi at 0.2% offset and an average grain size of 170 microns, i.e., lower yield strength than that used in Examples I and II but still outside of the parameters of the present invention. The core was then rolled with the cladding on both sides thereof in a single pass with a reduction of 65.5%. Good bond strengths were obtained, but there was still objectionable surface waviness in the claddings, albeit less severe than in Examples I and II. The resultant composite could be cold rolled after bonding; however, the additional reduction tended to increase the severity of the surface waves and decrease the bond strength to a point where the resultant composite could not be bent 90° and returned without causing delamination of the components.

EXAMPLE IV

This example is within the parameters of the present invention and illustrates the preparation of a metallurgically bonded composite without objectionable surface waviness. The core material was the commercial purity copper of Example II having a yield strength of about 52,000 psi at 0.2% offset. The cladding was a copper base alloy containing 2.5% aluminum, 1.5% silicon and the balance essentially copper processed as in Example I with annealing at 800° C. for four (4) hours to give a yield strength of 10,500 psi at 0.2% offset and an average grain size of 170 microns. Thickness relationships were as in Example I. The core was then rolled with the cladding on both sides thereof in a single pass with reductions of from 65 to 67% to provide well bonded, smooth composites. The composites were cold rolled a further 30% to 0.0625 inch, both directly and with a 600° C., one (1) hour anneal after bonding, to obtain appropriate coinage gage. The smoothness was not impaired and the composite was able to pass a 90° bend test and return without clad separation.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method of forming a metallurgically firmly bonded composite material having a smooth external surface which comprises: providing a copper core material in strip form in the hard temper having a minimum strength of 51,000 psi yield strength at 0.2% offset; providing a copper alloy cladding in strip form being fully annealed to an average grain size of at least 10 microns and having a maximum strength of less than 15,000 psi yield strength at 0.2% offset; and rolling together said core and cladding in an unheated condition in a single pass with a reduction of 50 to 75% to provide a metallurgically firmly bonded composite.

2. A method according to claim 1 wherein said cladding is a copper alloy containing from 2 to 3.5% aluminum, from 1 to 2.5% silicon and the balance essentially copper.

3. A method according to claim 2 wherein the core is commercially purity copper.

4. A method according to claim 1 wherein the core is clad on both sides with said cladding.

5. A method according to claim 4 wherein the core represents 40 to 90% of the thickness of the composite and the cladding from 5 to 30% on each side.

6. A method according to claim 1 wherein the average grain size of the cladding is at least 100 microns.

7. A method according to claim 1 wherein the resultant metallurgically firmly bonded composite is cold rolled to finish gage.

8. A method according to claim 1 wherein the resultant metallurgically firmly bonded composite has a thickness of from 0.01 to 0.1″.

9. A method according to claim 1 wherein the core and cladding enter the rolls at an angle of from 5° to 22° and come together for the first time in the bite of the rolls.

* * * * *